Dec. 28, 1937. C. P. SCHLEGEL 2,103,697
WEATHER STRIPPING AND METHOD OF MAKING THE SAME
Filed Feb. 8, 1936
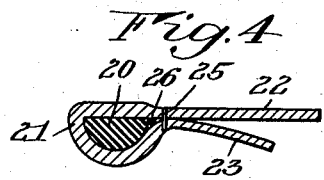
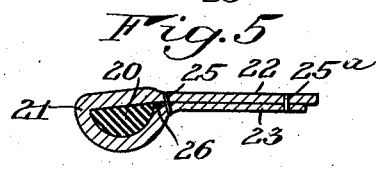
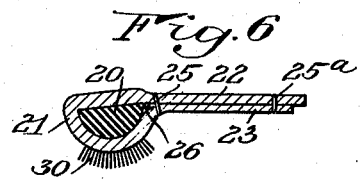
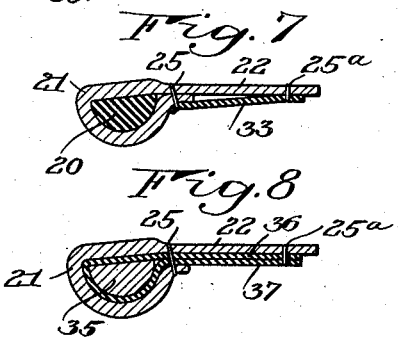
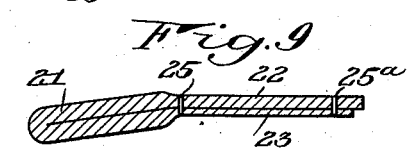
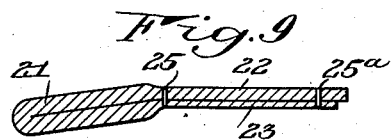
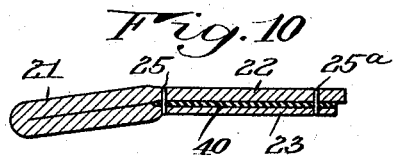
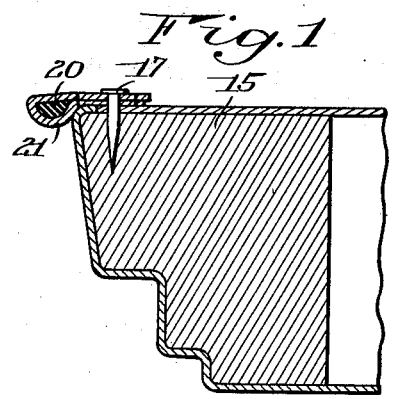
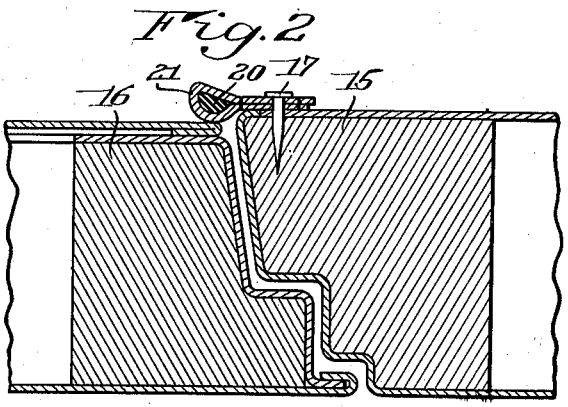
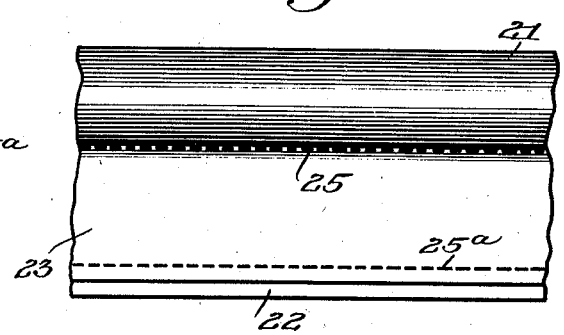
INVENTOR.
Charles P. Schlegel
BY
his ATTORNEY.

Patented Dec. 28, 1937

2,103,697

UNITED STATES PATENT OFFICE 2,103,697

WEATHER STRIPPING AND METHOD OF MAKING THE SAME

Charles P. Schlegel, Rochester, N. Y., assignor to The Schlegel Manufacturing Company, Rochester, N. Y., a corporation of New York Application February 8, 1936, Serial No. 62,919

8 Claims. (Cl. 20—69)

This invention relates to weather stripping useful on doors, windows, and other closures, movable or fixed, of automobiles, air craft, water craft, houses, and other structures, and to a method of making such weather stripping.

An object of the invention is the provision of generally improved and more satisfactory weather stripping of the above mentioned character, and of an improved method of making such weather stripping.

Another object is the provision of weather stripping having a portion which may be said to be biased in one direction, so that it tends constantly to move in one direction and thus presses against and maintains a tight joint with a contacting surface.

Still another object is the provision of a biased weather stripping of simple form, easy and inexpensive to manufacture, which retains its biased condition for long periods of time.

To these and other ends the invention resides in certain improvements and combinations of parts, all as will be hereinafter more fully described, the novel features being pointed out in the claims at the end of the specification.

In the drawing:

Fig. 1 is a diagrammatic cross section through a door jamb with the weather stripping of the present invention applied thereto, the door being open;

Fig. 2 is a similar view with the door closed and in contact with the weather stripping;

Fig. 3 is a side elevation of the weather stripping on an enlarged scale;

Fig. 4 is a diagrammatic cross section through a preferred form of weather stripping at a preliminary stage in its manufacture;

Fig. 5 is a similar view of the same weather stripping in its completed condition, and Figs. 6 to 10, inclusive, are similar diagrammatic views of modified forms of construction.

The same reference numerals throughout the several views indicate the same parts.

Referring first to Figs. 1 and 2 of the drawing, there is shown, as one example of the use of the present weather stripping, a door jamb 15 of an automobile, and a cooperating door 16. Secured to the door jamb 15 in any suitable manner, as by tacks 17, is a length of weather stripping for contact with the door when the door is closed, to make a tight and windproof joint between the door and the jamb. When weather stripping is used in this manner, it is commonly called a windlace. The weather stripping of the present invention is particularly adapted and suitable for use as a windlace, but is by no means limited to this particular use.

The weather stripping comprises an attaching portion or flange for application to the door jamb and another portion, usually but not necessarily thicker and stiffer than the attaching portion, which projects beyond the edge of the door jamb for contact with the door, all as plainly seen in Figs. 1 and 2. The so-called projecting portion of the weather stripping is preferably but not necessarily enlarged or thickened as by means of a core element 20 extending longitudinally through the projecting portion of the weather stripping. A suitable body of material 21, usually of woven textile material, surrounds and encloses the core 20, and is extended at 22 to form one layer or thickness of the attaching portion or flange of the weather stripping, which attaching portion or flange is of a laminated construction, being made up of two or more plies or thicknesses. The same material 21, or another strip of material secured thereto, is extended as at 23 to form another layer or ply of the attaching portion or flange. According to the present invention, the weather stripping is so constructed that the projecting portion, or portion enclosing the core 20, is biased with respect to the attaching portion, so that it has a constant tendency to pull over to one side or to move in a direction transverse to the plane of the attaching portion.

The biasing of the weather stripping may be accomplished in a variety of ways. For example, resilient or springy metal may be used, placed for instance between the two layers 22 and 23 and extending into the projecting portion of the weather stripping. Usually, however, it is preferred not to employ resilient metal in order to produce the bias of the weather stripping, but rather to produce this bias by tensioning one of the layers of the attaching portion or flange of the strip. The tensioned layer may be of either ordinary cellulosic woven textile threads, such as cotton or linen, or of threads of resilient rubber-like material, such as rubber or a composition containing rubber. Rubber threads (often surrounded by a coating or sheathing of cotton or linen threads) are known in themselves, and have commonly been employed in the manufacture of so-called elastic webbing but have not heretofore been used for the purposes of the present invention.

While the use of rubber-like material is preferred in the tensioned layer, it is not necessary, as satisfactory results have been secured by the tensioning of a layer of textile material woven from cotton or linen threads, which are found to have sufficient resiliency for present purposes, although somewhat better results are secured when rubber is used.

In the embodiment shown in Figs. 4 and 5, the portion 21 together with the portions 22 and 23 constitutes a single integral strip of woven textile material, but is not necessarily of the same thickness throughout, since it is possible as well known in the textile art, to weave a single integral strip of different thickness in different portions and even of different kinds of threads in different portions. Hence, although the single integral strip of textile material is used in this embodiment, the portion 21 may be thicker and heavier than the portions 22 and 23, and the portion 22 may be and preferably is thicker and heavier than the portion 23, and the portion 23 may be made all of cellulosic fibers (such as linen or cotton), or may be made partly of cellulosic fibers (the warp strands, for example, being of cotton or linen) and partly of rubber threads, strands, or fibers, (the weft strands of the portion 23 being, for example, of rubber threads interwoven near the junction of the portion 23 with the portion 21 with the cellulosic strands constituting the weft of the portion 21).

In making up the material, the portion 21 is wrapped around the core 20 with the two layers 22 and 23 in overlapping relationship with each other as in Fig. 4, and then the material is stitched as at 25 to fasten the two layers securely to each other and to enclose the core 20. A wire 26 may also be enclosed, if desired, to add additional stiffness to the construction and make the weather stripping hold its shape better.

Upon the completion of the stitching 25, the parts are substantially in the position shown in Fig. 4, the layer 23 being narrower than the layer 22 as shown. The layer 23 is then grasped near its right hand edge and pulled rightwardly to tension this layer, after which, while still held in tensioned position, the two layers are stitched to each other securely near their right hand edges along a line 25a. This stitching 25a holds the layer 23 in tensioned condition between the two parallel lines of stitching 25 and 25a, the tension of the layer 23 being resisted by the strength of the layer 22, which is woven sufficiently stiff and tightly so as to be able to resist the stress produced in the layer 22 by the reaction of the tension in the layer 23. When the weft strands of the layer 23 are of rubber, this layer may be pulled over or stretched to a considerable extent before being stitched at 25a. When the weft strands of the layer 23 are of cotton or linen, the layer will not be pulled over or stretched so far, but it will nevertheless be appreciably tensioned before the stitching 25a is applied, to produce an appreciable tension in this layer and a corresponding compression in the layer 22.

When the layer 23 has thus been tensioned, the tension in the layer is found in actual practice to tend to pull the projecting portion of the weather strip (that is, the portion which includes the core 20 and the material 21) out of the plane of the layers 22 and 23, constantly tending to move this projecting portion transversely out of such plane, and swing it around the stitching line 25 somewhat as though this stitching line were a hinge. Thus the projecting portion 20, 21 may be said to be biased in a direction out of the plane of the attaching portion made up of the layers 22 and 23. This biasing of the projecting portion is particularly valuable, as it causes the projecting portion 20, 21, to hub the edge of the door jamb as shown in Fig. 1, and to make a resilient contact with the door 16 and press firmly against the door surface all along the whole length of the weather strip when the door is closed as in Fig. 2. As seen, the closing of the door will move the projecting portion of the weather stripping back from the position shown in Fig. 1 to the position shown in Fig. 2, but when the door is next opened, the weather stripping will again spring forward to the position shown in Fig. 1 due to the tension of the layer 23. Whenever the door is closed, there will be a substantial pressure of the weather stripping against the door, and the joint between the door jamb and the door will be well sealed against ingress of wind.

If preferred, the projecting portion of the weather stripping or portion which contacts with the door, may be provided with relatively long stiff pile cemented to or preferably woven integrally with the portion 21, as indicated at 30 in Fig. 6. Such long stiff pile produces additional resiliency in the construction and somewhat improves the tightness of the joint between the weather stripping and the door, in some instances. This pile may be applied to all of the embodiments of weather stripping herein disclosed, if desired, but is illustrated only in connection with Fig. 6 for the sake of clarity.

A slightly different embodiment of the invention is shown in Fig. 7. Here, the parts 20, 21, 22, 25, and 25a remain as before, but instead of using a layer 23 of woven textile material integral with the parts 21 and 22, there is employed a layer 33 which, in this instance, is a sheet or web of rubber or rubber-like material. This resilient layer 33 is first stitched to the portions 21 and 22 by the stitching 25 and is then tensioned and stitched at 25a, in the manner previously described in connection with the layer 23.

In the embodiment shown in Fig. 8, construction somewhat similar to that illustrated in Fig. 7 is used, but instead of only a narrow strip of rubber or rubber-like material, there is employed a wider strip which is carried entirely around the core 35 to enclose it as shown, and to form layers 36 and 37 overlying the textile layer 22. The parts are first stitched together at 25, and then both layers 36 and 37 of the rubber sheeting or the like are tensioned and stitched at 25a to themselves and to the textile layer 22. If desired, the layer 37 may be tensioned to a somewhat greater degree than the layer 36.

When the core forming the enlargement in the projecting or door contacting part of the weather strip is surrounded only by textile material, as in Figs. 4 to 7 inclusive, the core is preferably made of a material which is not affected by moisture. It may conveniently be made of a rod or strip of rubber. When, however, the core is surrounded by a sheet of rubber, or the like, as in the case of the core 35 in Fig. 8, then the surrounding sheet of rubber-like material protects this core from moisture and the core itself need not be of a material unaffected by moisture. The core 35 may be, for example, of fiber or fibrous material.

In Fig. 9, there is illustrated another modification employing parts 21, 22, 23, 25, and 25a, as in the case of Figs. 4 and 5, but omitting the core 20. The portion 21 including the projecting or door engaging part of the weather stripping is preferably woven substantially thicker than the parts 22 and 23, as shown. The layer 23 is tensioned as before.

In Fig. 10 there is shown a construction similar in general to that illustrated in Fig. 9, and employing the same parts, with the addition of a layer 40 of rubber or rubber-like material interposed between the two layers 22 and 23. This layer 40 may be in the form of a self-sustaining sheet, such as a sheet of rubber or the like, or it may be a layer of latex or the like applied in liquid, semi-liquid, or plastic form to the inner surface of the layer 23. When such a latex or rubber-like coating is employed on the tensioned layer, applied thereto preferably before the tensioning operation, the results are found to be improved over those obtained when no such coating is used and when the tensioned layer does not contain rubber strands but merely cellulosic strands of cotton, linen, or the like.

Those portions of any of the herein disclosed constructions which are of woven textile material may be woven integrally as one piece at one operation, or may be separately woven as distinct strips or pieces and then secured together by stitching, cement, or other suitable securing means.

Any kind of fabric or other desired finishing material may be employed as an outer layer or covering on the exposed parts of the construction to give the weather stripping any desired appearance and to make it match the rest of the trim or structure with which the weather stripping is to be used.

Instead of being secured to each other by stitching, the layers of the attaching flange or portion of the weather stripping may be secured to each other by suitable adhesive or cement, either along two spaced parallel lines, with one layer tensioned between these two lines, or applied throughout the entire contacting overlapping areas of the respective layers with one or more layers likewise in a tensioned condition as above described.

While certain embodiments have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Weather stripping comprising a strip of material having one portion for attachment to one member near an edge thereof and another portion to project beyond said edge of said member for contact with a second member, said attaching portion of said strip being laminated and having one layer formed to provide substantial resistance to compression in the plane of the layer and having another layer tensioned in order to give said projecting portion of said strip a bias in a direction transverse to the plane of said attaching portion.

2. Weather stripping comprising a strip of material having one portion for attachment to one member near an edge thereof and another portion to project beyond said edge of said member for contact with a second member, said attaching portion of said strip being laminated and having the layers thereof secured to each other by two approximately parallel spaced lines of stitching, one of said layers having substantial resistance to compression in the plane of the layer, another of said layers being under greater tension between said two lines of stitching than said one of said layers, in order to tend to pull said projecting portion of said strip in a direction transverse to the plane of said attaching portion.

3. Weather stripping comprising a strip of material having one portion for attachment to one member near an edge thereof and another portion to project beyond said edge of said member for contact with a second member, said attaching portion of said strip being laminated and having the layers thereof secured to each other by two approximately parallel spaced lines of stitching, one of said layers having appreciable resistance to compression in its own plane and another of said layers including rubber-like material and being under greater tension between said two lines of stitching than said one of said layers, in order to tend to pull said projecting portion of said strip in a direction transverse to the plane of said attaching portion.

4. Weather stripping comprising a strip of material having one approximately flat portion for attachment to one member near an edge thereof and another portion to project beyond said edge of said member for contact with a second member, said attaching portion of said strip being laminated and having the layers thereof secured to each other by two approximately parallel spaced lines of stitching, one of said layers having appreciable resistance to compression in its own plane and another of said layers including rubber-like material stretched relatively to said one of said layers and maintained in stretched condition by said stitching while both of said layers remain approximately flat, so that the tension of said rubber-like material tends to bias said projecting portion of said strip relatively to said attaching portion thereof.

5. Weather stripping comprising a strip of material having one portion for attachment to one member near an edge thereof and another portion to project beyond said edge of said member for contact with a second member, said attaching portion of said strip being laminated and approximately flat, one layer of said laminated attaching portion being of relatively stiff woven textile material and another layer of said attaching portion including resilient rubber-like material stretched relatively to said stiff textile layer and maintained in stretched condition, so that the tension of said rubber-like material tends to bias said projecting portion of said strip relatively to said attaching portion thereof.

6. Weather stripping comprising a strip of material including an attaching zone running along said strip adjacent one edge thereof and a contacting zone running along said strip adjacent an opposite edge thereof, one of said zones being made up of a plurality of plies, and one of said plies near one surface being tensioned relatively to another of said plies near an opposite surface, in a direction transversely across the strip, to tend to maintain said strip resiliently in a predetermined cross sectional shape.

7. The method of making weather stripping from a strip of woven textile material which comprises folding the strip back upon itself to provide two superimposed layers of material, securing said two layers to each other along one line spaced from their folded edge, tensioning one of said layers relatively to the other, and then securing said two layers to each other along a second line spaced from said first line and on the opposite side thereof from said folded edge, to maintain said tensioned layer in tensioned condition to bias a part of said material in one direction.

8. The method of making weather stripping from two superimposed layers of material, one of said layers being of woven textile material of substantial stiffness and exhibiting appreciable resistance to compression in the direction of its width, another of said layers including resilient rubber-like material, which comprises the steps of stitching said two layers to each other along a first longitudinal line spaced materially inwardly from the side edges of said layers, stretching the one of said layers which includes resilient rubber-like material, and then stitching said two layers to each other along a second longitudinal line spaced from said first line of stitching, to maintain said stretched layer in stretched condition to tend to bias that portion of said layers lying on the opposite side of said first line of stitching from said second line of stitching.

CHARLES P. SCHLEGEL.